United States Patent
Misono

[11] Patent Number: 5,225,475
[45] Date of Patent: Jul. 6, 1993

[54] RUBBER COMPOSITION
[75] Inventor: Shinji Misono, Gotenba, Japan
[73] Assignee: Tokai Carbon Co., Ltd., Tokyo, Japan
[21] Appl. No.: 785,564
[22] Filed: Oct. 30, 1991
[30] Foreign Application Priority Data
  Nov. 1, 1990 [JP] Japan .................. 2-296333
[51] Int. Cl.$^5$ .............................. C08K 3/04
[52] U.S. Cl. ..................... 524/496; 524/495; 423/445
[58] Field of Search ............. 524/496; 423/445

[56] References Cited
U.S. PATENT DOCUMENTS

| | | | |
|---|---|---|---|
| 4,478,973 | 10/1984 | Misono et al. | 524/496 |
| 4,721,740 | 1/1988 | Takeshita et al. | 524/496 |
| 4,786,677 | 11/1988 | Nakai et al. | 524/496 |
| 5,025,059 | 6/1991 | Mouri et al. | 524/496 |
| 5,093,407 | 3/1992 | Komai et al. | 423/445 |
| 5,124,396 | 6/1992 | Branan, Jr. et al. | 423/445 |

FOREIGN PATENT DOCUMENTS 63-112638 5/1988 Japan .
63-179941 7/1988 Japan .
63-297439 12/1988 Japan .

Primary Examiner—Paul R. Michl
Assistant Examiner—Olga Asinovsky
Attorney, Agent, or Firm—Armstrong, Westerman, Hattori, McLeland & Naughton

[57] ABSTRACT

A rubber composition comprising 100 parts by weight of a rubber component which consists of a natural rubber alone or a blend of a natural rubber with a dienic synthetic rubber and from 35 to 100 parts by weight of a carbon black compounded into the rubber. The carbon black has a nitrogen adsorption specific surface area ($N_2SA$) of 100 to 160 m$^2$/g and also a true specific gravity and a mode diameter of intraaggregate pore ($\overline{D}p$) which satisfy, respectively, the relations $$\text{true specific gravity} \leq 1.8379 - 0.0006 \times N_2SA \quad (1)$$

$$\overline{D}p \leq 75.2 \times \frac{DBP}{N_2SA} - 8.0 \quad (2)$$

where $\overline{D}p$ in the formula (2) represents the mode diameter at the maximum frequency in the intraaggregate pore diameter distribution of the carbon black determined with a differential scanning calorimeter (DSC), and DBP represents the dibutyl phthalate absorption number.

2 Claims, 1 Drawing Sheet

RUBBER COMPOSITION

BACKGROUND OF THE INVENTION

This invention relates to a high-performance rubber composition which combines excellent wear resistance with low heat buildup and is suited for use in tread members of large-size radial tires for trucks and buses.

Carbon black for the reinforcement of rubber is classified into many types according to the properties of their own. Each of these properties is a major determinant of the characteristics of a given rubber composition in which the particular carbon black is incorporated. Usually, therefore, when a carbon black is to be compounded into rubber, one capable of imparting the properties suited for the intended use of the resulting rubber goods is chosen.

Rubber members, e.g., the treads of large tires for trucks and buses, are required to be highly abrasion-resistant under severe service conditions. For these applications it has been believed effective to use a carbon black of small particle size and large specific surface area, such as SAF (N110) or ISAF (N220).

However, such a hard carbon black tends to increase the heat buildup of rubber goods. When used in tire treads, it can promote heat buildup in running tires, eventually destroying the inside structure or causing premature aging of the tire tread structural material.

Meanwhile, development of fuel-saving tires is energetically under way as part of efforts to meet the public needs for the reduction of natural resource and energy consumption. For the development of such economical tires a rubber composition of low heat build-up is indispensable.

It follows that an ideal rubber member for the tread of those tires could be obtained if both high abrasion resistance and low heat buildup could be imparted to the rubber member using a carbon black of small particle size and large specific surface area.

As regards the rubber compositions that could impart both of the contradictory properties, high abrasion resistance and low heat buildup, systematic investigations have been made from the standpoint of carbon black. They are typified by the following proposals (a) to (c).

(a) A rubber composition for large tire treads containing a carbon black which is fine in particle size and yet has a relatively broad aggregates Strokes diameter distribution (Japanese patent application Kokai publication No. 63-112638).

(b) A rubber composition containing a carbon black which has two maximum points within a specific range of the aggregates Stokes diameter distribution (Japanese patent application Kokai publication No. 63-179941).

(c) A rubber composition containing a carbon black which has a value defined by a formula within a specific range, the formula using as variables the dibutyl phthalate absorption number, dibutyl phthalate absorption number of compressed sample, blackness, nitrogen adsorption specific surface area, and iodine adsorption (Japanese patent application Kokai publication No. 63-297439).

However, the composition (a) is not fully satisfactory in respect of abrasion resistance, although the heat buildup of the resulting rubber article is low on account of the broad aggregate distribution of the carbon black.

The composition (b) gives the rubber article both low heat buildup and high abrasion resistance but it fails to satisfy the market requirements that are becoming more and more severe.

The same applies to the composition (c) and the latter is yet to be improved to meet the market needs.

The present invention has been accomplished in the course of development of a rubber composition in the wake of the compositions (a) to (c) above. It is predicated upon the discovery that rubber properties suitable for the treads of large tires are obtained by mixing a rubber component with a carbon black which has a true specific gravity and a mode diameter of intraaggregate pore each within a specific range.

SUMMARY OF THE INVENTION

This invention aims at providing a rubber composition which combines high abrasion resistance with low heat buildup and is suited for use in treads of large tires.

The object of the invention is achieved by a rubber composition comprising 100 parts by weight of a rubber component which consists of a natural rubber alone or a blend of a natural rubber with a dienic synthetic rubber and from 35 to 100 parts by weight of a carbon black compounded thereinto, said carbon black having a nitrogen adsorption specific surface area ($N_2SA$) of 100 to 160 $m^2/g$ and also a true specific gravity and a mode diameter of intraaggregate pore ($\overline{D}p$) which satisfy, respectively, the relations $$\text{true specific gravity} \leq 1.8379 - 0.0006 \times N_2SA \quad (1)$$

$$\overline{D}p \leq 75.2 \times \frac{DBP}{N_2SA} - 8.0 \quad (2)$$

where $\overline{D}p$ in the formula (2) represents the mode diameter at the maximum frequency in the intraaggregate pore diameter distribution of the carbon black determined with a differential scanning calorimeter (DSC), and DBP represents the dibutyl phthalate absorption number.

DESCRIPTION OF THE PREFERRED EMBODIMENTS

Figure 1:
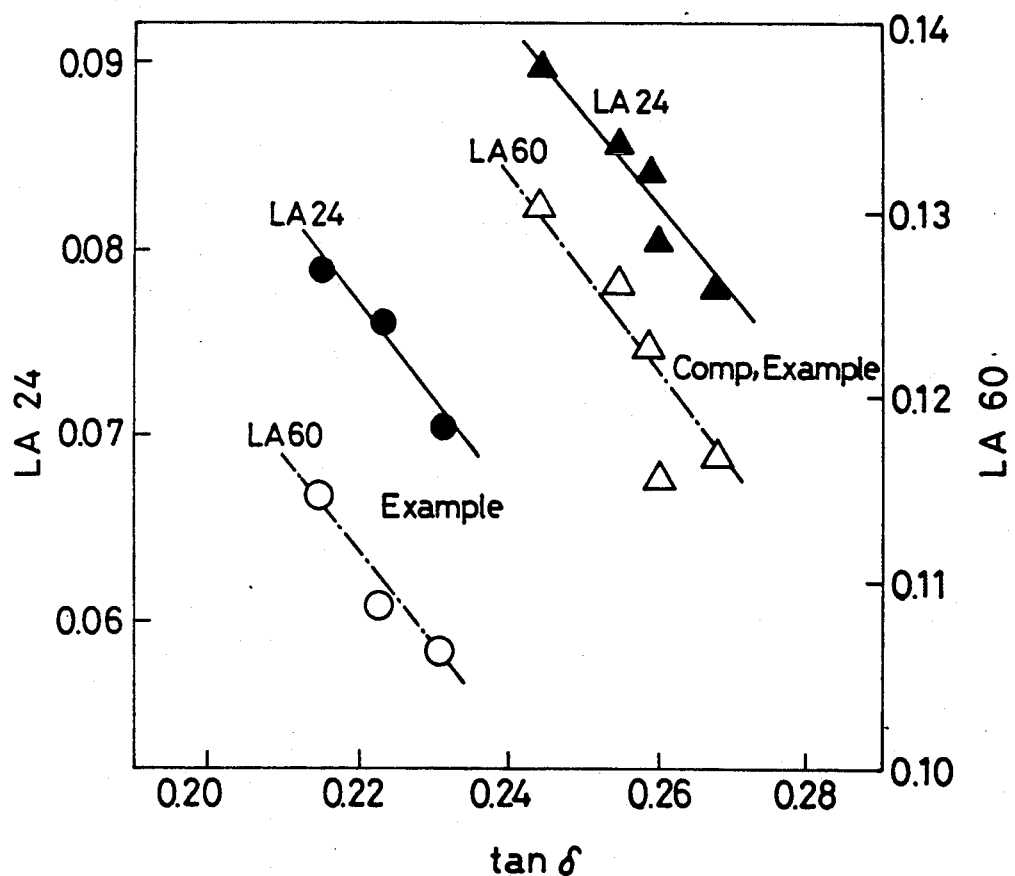
FIG. 1 is a graph showing the relation between the Lambourne abrasion loss amounts (LA24) and (LA60) and hysteresis loss factor (tan δ) of rubber compositions embodying the present invention (Examples) and rubber compositions which do not satisfy the compositional requirements of the invention (Comparative Example).

The values of various properties of carbon black in the rubber composition according to the invention were determined by the following methods:

A: Nitrogen adsorption specific surface area ($N_2SA$):

It was measured in conformity with ASTM D3037-88 "Standard Test Method for Carbon Black-Surface Area by Nitrogen Absorption" - Method B.

The value measured in this way of IRB#6 was 76 $m^2/g$.

B: True specific gravity:

Test carbon black was placed into a crucible fitted with a drop lid and deaerated at 650°±25° C. for 5 minutes. A suitable amount of the deaerated sample was weighed into a pycnometer, dipped in a small amount of benzene, and was deaerated under a vacuum of 2-5 mmHg until no more bubbling was observed. Next, the pycnometer was filled up with benzene and held in a thermostatted water bath at 25°±0.1° C. for 30 minutes, and then the charge was weighed. The true specific gravity value was caculated from the equation:

$$\text{true specific gravity} = \frac{(D - A)}{(D - A) - (E - C)} \times d_4^{25}$$

where A is the weight of the pycnometer, C is the combined weight of the pycnometer and benzene, D is the combined weight of the pycnometer and test carbon black, E is the total weight of the pycnometer, test carbon black, and benzene, and $d_4^{25}$ is the specific gravity of benzene at 25° C. The value measured in this manner of IRB#5 was 1.7903.

C: $\overline{D}p$:

This is the mode diameter of the maximum frequency in the intraaggregate pore diameter distribution of the carbon black determined with a differential scanning calorimeter (DSC) as described above. The measurement under the invention follows the procedure described in the paper by Brun et al. as will be referred to later. First, in accordance with JIS K6221 (1982) 5 "Method of Preparing Dry Samples", test carbon black was dried, accurately weighed, and mixed with distilled water to form a paste with a carbon black concentration of 0.250 g/cm³. It was thoroughly dispersed supersonically. Within 10 minutes after the supersonic dispersion, measurement of the intraaggregate pore distribution with a differential scanning calorimeter (DSC "DSC 30" manufactured by Mettler Co.) was started. The amount of the paste sampled for this purpose was in the range of about 3 to 5 mg. The paste was placed in a sample container made of aluminum and sealed. After the confirmation of the paste mass, the container was set in the DSC, and the measurement was made in the following steps:

(1) cooling from room temperature to −80° C.;
(2) heating from −80° C. to −5° C. at the rate of 10° C./min;
(3) heating from −5° C. to −0.1° C. at the rate of 1° C./min, followed by keeping isothermally at −0.1° C. (a temperature lower than the freezing point of distilled water by 0.1° C.) for 10 minutes; and
(4) slow cooling from −0.1° C. down to −8° C. at the rate of 0.1° C./min and recording a freezing thermogram with a recorder.

Next, from the temperature as the abscissa of the freezing thermogram the depression of the freezing point of distilled water, ΔT, was found and from the ordinate the y (mm) per 0.1° C. was read. The ΔT and y thus obtained were substituted, respectively, into Equations (3) and (4) below to get the pore distribution (ΔV/ΔDp).

$$Dp = \frac{135.34}{\Delta T} + 1.14 \quad (3)$$

$$\Delta V/\Delta Dp = K \cdot \frac{(\Delta T)^2}{Wa} \times y \quad (4)$$

where Wa is the heat of solidification of distilled water and K is the factor taking the sensitivity of the DSC unit and the mass of the sample used into consideration.

In the pore distribution, ΔV/ΔDp=f(Dp), obtained from Equation (4), the pore diameter (Dp) that gives the maximum ΔV/ΔDp value is defined as $\overline{D}p$ (Dp mode diameter).

The paper by Brun et al. referred to above appeared in Thermoshimica Acta, 21 (1977), 59-88 under the heading "A NEW METHOD FOR THE SIMULTANEOUS DETERMINATION OF THE SIZE AND THE SHAPE OF PORES: THE THERMOPOROMETRY".

The $\overline{D}p$ thus determined of IRB#6 was 95.3 nm.

D: Dibutyl phthalate absorption (DBP):

JIS K6221 (1975) "Method of Testing Carbon Black for Rubber", Section 6.1.2, Method A (corresponding to ASTM D2414-82). The value determined in conformity with this method of IRB#6 was 99.0 ml/100 g.

The carbon black in the present invention having the aforementioned characteristic properties can be produced by controlling various conditions, such as feed rate of feedstock oil, fuel oil and air, feeding condition of oxygen gas, using, for example, an oil furnace. This oil furnace comprises an air feed inlet in the tangential direction thereof, a combustion chamber provided with a combustion burner and a feedstock oil spray nozzle both inserted thereinto in the axial direction of the furnace, a narrow reaction chamber extending from the combustion chamber, and a broad reaction chamber extending from the narrow reaction chamber and provided therein with a cooling water spray nozzle.

According to a customary method, the carbon black in the present invention may be compounded into natural rubber, or dienic synthetic rubber such as styrene-butadiene rubber, polybutadiene rubber, isoprene rubber, butyl rubber, and various other elastomers such as various synthetic rubbers and blended rubbers which can be reinforced with ordinary carbon blacks. The compounding amount of the carbon black is 35 to 100 parts by weight based on 100 parts by weight of the rubber component, and the carbon black may be compounded together with any other necessary ingredients such as a vulcanizing agent, vulcanization accelerator, antioxidant, vulcanization aid, softener, and plasticizer to provide a rubber composition of the present invention.

Of the properties of the carbon black according to the invention, the nitrogen adsorption specific surface area (N₂SA) of the particles is such that when it is in the range of 100 to 160 m²/g the carbon black falls under the category of hard type. That type is capable of giving the rubber a high degree of abrasion resistance and a proper heat buildup. If the N₂SA is less than 100 m²/g the rubber is not adequately resistant to wear. If it is more than 160 m²/g the particles become poorly dispersible in the rubber, failing to enhance the abrasion resistance smoothly and extremely increasing the heat buildup.

The true specific gravity of carbon black in the present invention is a unique characteristic independent of the particle diameter of structure. It can be regarded as a parameter indicative of the degree to which the carbon microcrystal structure is formed in the individual particles in the course of manufacture of the carbon black. For example, a carbon black of low true specific gravity is considered to be rich in chemically active radicals on the surfaces of the particles because of inadequate formation of the carbon microcrystal structure and a large residual hydrocarbon content.

The fact that the true specific gravity according to the invention is not higher than (1.8379−0.0006×N₂SA) signifies a high activity on the particle surface of the carbon black. The active surface apparently enhances the affinity of the carbon black for the rubber and reduces the heat buildup of the rubber component.

In contrast to this, the true specific gravities of commercially available carbon blacks according to our determination exceed $1.8379 - 0.0006 \times N_2SA$. The results are shown in Table 1.

The mode diameter of intraaggregate pore ($\overline{D}p$) is a parameter indicating the magnitude of voids in intricately shaped aggregates formed by the solid fusion and combination of primary carbon black particles. It is intimately related to the reaction temperature, turbulence of combustion gas, and other conditions involved in the process of carbon black production. Thus, $\overline{D}p$ is correlated with the structure and specific surface area of the particles. It has been confirmed through our investigations that commercially available carbon blacks have $\overline{D}p$ values within the range of $\overline{D}p = (75.2 \times DBP/N_2SA) \pm 3.0$, as listed also in Table 1.

For example, the $\overline{D}p$ of IRB#6 is calculated from its DBP and $N_2SA$ to range from 95.0 to 101.0 nm. The actually determined value, 95.3 nm, comes within this range.

TABLE 1

|  | N110 | N103 | N220 | SRB C-3 | SRB C-4 |
|---|---|---|---|---|---|
| $N_2SA$ | 142 | 142 | 118 | 120 | 127 |
| DBP | 115 | 130 | 116 | 120 | 131 |
| True sp. gr. | 1.7603 | 1.7653 | 1.7764 | 1.7739 | 1.7715 |
| Dp mode dia. | 60.4 | 66.2 | 75.6 | 77.6 | 77.6 |
| True sp. gr. calcd. value (1) | 1.7527 | 1.7527 | 1.7671 | 1.7659 | 1.7617 |
| Dp calcd. value (2) | 57.9 –63.9 | 65.8 –71.8 | 70.9 –76.9 | 72.2 –78.2 | 74.6 –80.6 |

Notes:
(1) True specific gravity = $1.8379 - 0.0006 \times N_2SA$.
(2) $Dp = 75.2 \times DBP/N_2SA \pm 3.0$ The range of $\overline{D}p$ in conformity with the invention, as shown above, is such that the intraaggregate pore size corresponding to the structure and nitrogen adsorption specific surface area of the carbon black is relatively small compared with those of conventional carbon blacks. It is this property that adds strength to the rubber in which the carbon black is compounded.

Under the invention the afore-described properties of the carbon black seem to function combinedly and synergistically to confer both high reinforcement and low heat buildup on the rubber composition.

The invention is illustrated by the following Examples as contrasted with Comparative Examples.

EXAMPLES 1-3 AND COMPARATIVE EXAMPLES 1-5

An oil furnace was installed which comprised a combustion chamber (800 mm in diameter and 600 mm long) having an air feed inlet directed tangentially toward the furnace top, and a combustion burner and a feedstock oil spray nozzle both inserted into the chamber along its axis; a small-diameter reaction chamber (150 mm in diameter and 1000 mm long) coaxially connected to the combustion chamber; and a large-diameter reaction chamber (400 mm in diameter) extending from the small-diameter chamber.

As the feedstock oil, an aromatic hydrocarbon oil having a specific gravity (15/4° C.) of 1.073, a viscosity (Engler, 40/20° C.) of 2.10, a toluene-insolubles content of 0.03%, and the Bureau of Mines Correlation Index (BMCI) of 140 was used. A hydrocarbon oil having a specific gravity (15/4° C.) of 0.903, a viscosity (Cst/50° C.) of 16.1, a residual carbon content of 5.4%, and a flash point of 96% was employed as the fuel oil.

Six different types of furnace carbon blacks were prepared using the above reaction furnace, feedstock oil, and fuel oil, under varied production conditions including feedstock oil, fuel oil, and air supplies with or without the addition of oxygen gas. The properties of the carbon blacks thus obtained, as compared with the production conditions used, are shown in Table 2. In the table, Comparative Examples 4 and 5 represent commercially available carbon blacks ISAF (grade N220 according to ASTM D-1765) and SAF (grade N110 according to ASTM D-1765), respectively.

TABLE 2

| Condition and Property | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Production condition | | | | | | | | |
| Air feed rate (Nm³/H) | 2800 | 2800 | 2800 | 3800 | 3800 | 3800 | — | — |
| Oxygen gas feed rate (Nm³/H) | 200 | 210 | 210 | — | — | — | — | — |
| Fuel oil feed rate (kg/H) | 195 | 208 | 197 | 156 | 156 | 156 | — | — |
| Qty of fuel oil atomizg air (Nm³/H) | 250 | 250 | 250 | 200 | 200 | 200 | — | — |
| Fuel oil combustion percentage (%) | 200 | 190 | 200 | 250 | 250 | 250 | — | — |
| Feedstock oil feed rate (kg/H) | 954 | 895 | 795 | 1032 | 1008 | 804 | — | — |
| Property | | | | | | | | |
| $N_2$ adsorpn specific surf. area (m²/g) | 110 | 123 | 140 | 108 | 120 | 145 | 118 | 143 |
| Dibutyl phthalate absorpn no. (ml/100 g) | 90 | 115 | 110 | 95 | 110 | 115 | 115 | 116 |
| True specific gravity | 1.7594 | 1.7510 | 1.7416 | 1.7947 | 1.7783 | 1.7421 | 1.7704 | 1.7603 |
| $[1.8379 - 0.0006 \times N_2SA]$ value | 1.7719 | 1.7641 | 1.7739 | 1.7731 | 1.7659 | 1.7509 | 1.7671 | 1.7521 |
| Intraaggregate pore mode dia. (nm) | 50.8 | 56.9 | 49.3 | 67.2 | 72.1 | 58.5 | 75.6 | 60.4 |
| $[75.2 \times DBP/N_2SA - 8.0]$ value | 54.9 | 62.3 | 51.1 | 58.1 | 60.9 | 51.6 | 65.3 | 53.0 |

*Fed as mixed with combustion air.

Next, the samples of these carbon blacks were compounded together with other ingredients into natural rubber in a mixing ratio given in Table 3.

TABLE 3

| Compounding ingredient | Part by weight |
|---|---|
| Natural rubber (RSS #1) | 100 |
| Carbon black | 50 |
| Aromatic oil | 4 |
| Stearic acid | 3 |

TABLE 3-continued

| Compounding ingredient | Part by weight |
|---|---|
| Zinc oxide | 5 |
| Dibenzothiazyl disulfide | 1 |
| Sulfur | 2.5 |

The compounds of the formulation shown in Table 3 were vulcanized at 145° C. for 40 minutes, and the resulting rubber compositions were subjected to various rubber tests. The results are summarized in Table 4. The methods and conditions used for the measurement of the rubber properties were as follows:

1) Lambourne abrasion loss amount

The measurement was made using a Lambourne abrasion tester (with mechanical slip mechanism), under the following conditions:

Test pieces: 10 mm thick and 44 mm in OD.
Emery wheel: GC type, abrasive grain size of 80 mesh, hardness of H.
Carborundum powder added: Grain size of 80 mesh, quantity added of about 9 g/min.
Emery wheel surface-test piece relative slip ratio: 24%, 60%.
Speed of revolution of test pieces: 535 rpm.
Load on test pieces: 4 kg.

2) tan δ hysteresis loss factor

Using a visco-elastic spectrometer (manufactured by Iwamoto Seisakusho Co.), the measurement was made under the following conditions:

Test pieces: 2 mm thick, 30 mm long, 5 mm wide.
Temperature: room temperature.
Frequency: 50 Hz, dynamic strain $\epsilon$: ±1%.

3) Others

All other tests were done in conformity with JIS K6301 "Physical Testing Methods for Vulcanized Rubber".

greater abrasion resistance and yet are significantly lower in tan δ that is a measure of the heat buildup. It also can be seen that other reinforcing factors are kept high.

FIG. 1 is a graphic representation of the relation between the Lambourne abrasion loss amount and tan δ in the Examples and Comparative Examples. It clearly indicates that the rubber compositions of the Examples of the invention are improved in both abrasion resistance and heat buildup over the comparative compositions.

As stated above, the present invention is able to provide a rubber composition which combines a high degree of reinforcing performance with low heat buildup through selective control of specific properties of carbon black unlike those of the prior art. Thus, the composition is very useful in fashioning tread members of large-size radial tires for trucks, buses, and other similar vehicles.

What is claimed is:

1. A rubber composition comprising 100 parts by weight of a rubber component which consists of a natural rubber alone or a blend of a natural rubber with a dienic synthetic rubber and from 35 to 100 parts by weight of a carbon black compounded thereinto, said carbon black having a nitrogen adsorption specific surface area ($N_2SA$) of 100 to 160 $m^2/g$ and also a true specific gravity and a mode diameter of intraaggregate pore ($\overline{D}p$) which satisfy, respectively, the relations $$\text{true specific gravity} \leq 1.8379 - 0.0006 \times N_2SA \quad (1)$$

$$\overline{D}p \leq 75.2 \times \frac{DBP}{N_2SA} - 8.0 \quad (2)$$

where $\overline{D}p$ in the formula (2) represents the mode diameter at the maximum frequency in the intraaggregate pore diameter distribution of the carbon black determined with a differential scanning calorimeter (DSC), and DBP represents the dibutyl phthalate absorption number.

TABLE 4

| Rubber property | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Lambourne abrasion test | LA24 | 0.0783 | 0.0761 | 0.0704 | 0.0897 | 0.0838 | 0.0801 | 0.0851 | 0.0776 |
| abrasion loss amount (cc) | LA60 | 0.1149 | 0.1088 | 0.1063 | 0.1300 | 0.1226 | 0.1152 | 0.1254 | 0.1168 |
| tan δ | | 0.215 | 0.223 | 0.231 | 0.244 | 0.259 | 0.260 | 0.255 | 0.268 |
| Hardness (JIS Hs) | | 64 | 65 | 65 | 63 | 65 | 66 | 65 | 66 |
| 300% modulus (kg/cm$^2$) | | 116 | 128 | 125 | 106 | 119 | 124 | 129 | 117 |
| Tensile strength (kg/cm$^2$) | | 299 | 293 | 305 | 274 | 281 | 303 | 277 | 289 |
| Elongation (%) | | 590 | 570 | 580 | 620 | 595 | 575 | 580 | 590 |
| Impact resilience (%) | | 53.8 | 53.1 | 51.6 | 51.8 | 49.5 | 47.8 | 49.7 | 46.9 |

Table 4 compares the rubber compositions of Examples 1 to 3 that meet the requirements of the present invention with those of Comparative Examples 1 to 4 that have the same nitrogen adsorption specific surface area but do not meet the requirements of the invention. It will be appreciated that the former have equivalent or 2. A rubber composition in accordance with claim 1, wherein the carbon black has a nitrogen adsorption specific surface area ($N_2SA$) in the range of 100 to 145 $m^2/g$.

* * * * *